United States Patent [19]

Naudy et al.

[11] 4,028,049
[45] June 7, 1977

[54] METHOD AND INSTALLATION OF TREATING RAW MATERIAL FOR PRODUCING CEMENT

[75] Inventors: René Naudy, Narbonne; Francois Phoyu, Port La Nouvelle; Louis Robert, Port La Nouvelle; Maurice Legousse, Port La Nouvelle; Jean-Marie Audouard, Boulogne; Hervé Le Roux, Montelimar, all of France

[73] Assignee: Ciments Lafarge S.A., Paris, France

[22] Filed: Mar. 25, 1975

[21] Appl. No.: 561,856

[30] Foreign Application Priority Data

Mar. 29, 1974 France ............................ 74.11196
Sept. 11, 1974 France ............................ 74.30711

[52] U.S. Cl. .................................. 432/14; 432/106
[51] Int. Cl.² ........................................ F27B 15/00
[58] Field of Search ........................... 432/14–16, 432/58, 105, 106

[56] References Cited

UNITED STATES PATENTS

| 2,663,560 | 12/1953 | Müller et al. | 432/14 |
| 3,452,968 | 7/1969 | Shimizu et al. | 432/16 |
| 3,738,794 | 6/1973 | Thelen | 432/14 |
| 3,843,314 | 10/1974 | Ishikawa | 432/16 |
| 3,869,248 | 3/1975 | Hirai et al. | 432/58 |
| 3,881,861 | 5/1975 | Ritzmann | 432/58 |
| 3,881,862 | 5/1975 | Nishida et al. | 432/14 |
| 3,891,383 | 6/1975 | Kobayshi | 432/80 |
| 3,904,353 | 9/1975 | Bosshand et al. | 432/106 |

FOREIGN PATENTS OR APPLICATIONS 1,184,744 1/1965 Germany ............................ 432/14

Primary Examiner—John J. Camby
Assistant Examiner—Henry C. Yuen
Attorney, Agent, or Firm—Hubbell, Cohen, Stiefel & Gross

[57] ABSTRACT

Raw material for making cement is treated in an installation comprising a plurality of superimposed cyclones constituting a multi-stage exchanger wherein the solid raw material and gases issuing from a clinkerization furnace circulate counter-currently, and wherein at least a portion of the raw material issuing from the penultimate exchanger stage is injected into the gas current produced by the furnace. The raw material is injected in the form of a "curtain", or "screen", into an upstream section of the furnace. This novel method and the novel device for carrying out said method allow the building-up of deposits upstream of the furnace to be eliminated.

4 Claims, 8 Drawing Figures

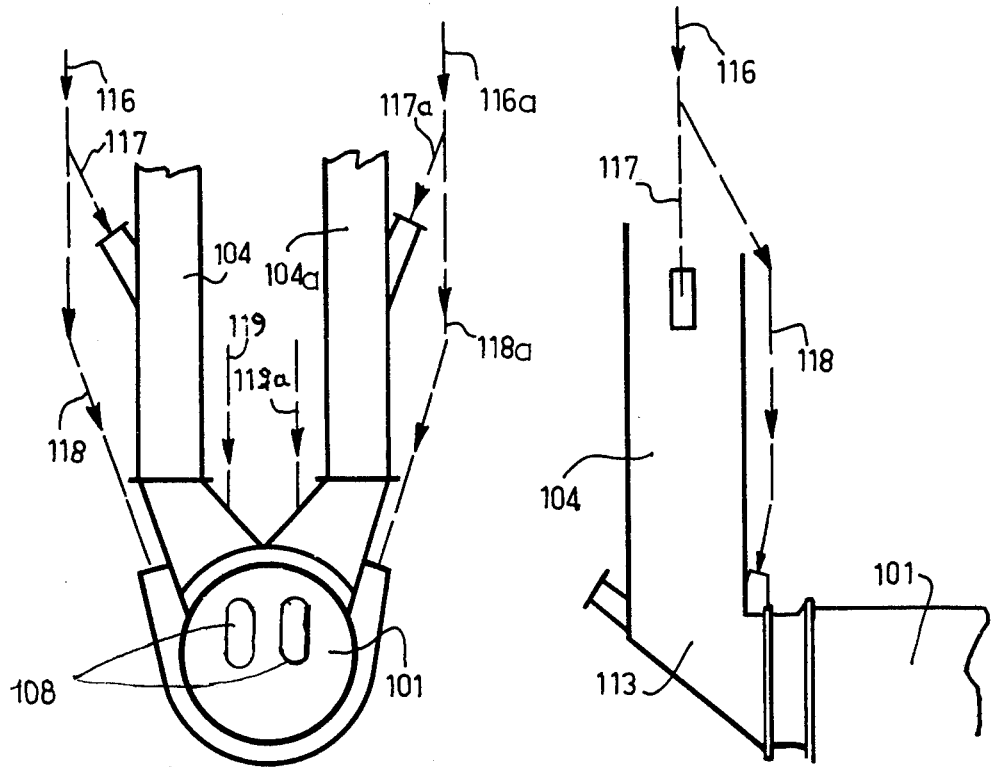
FIG. 6
FIG. 7
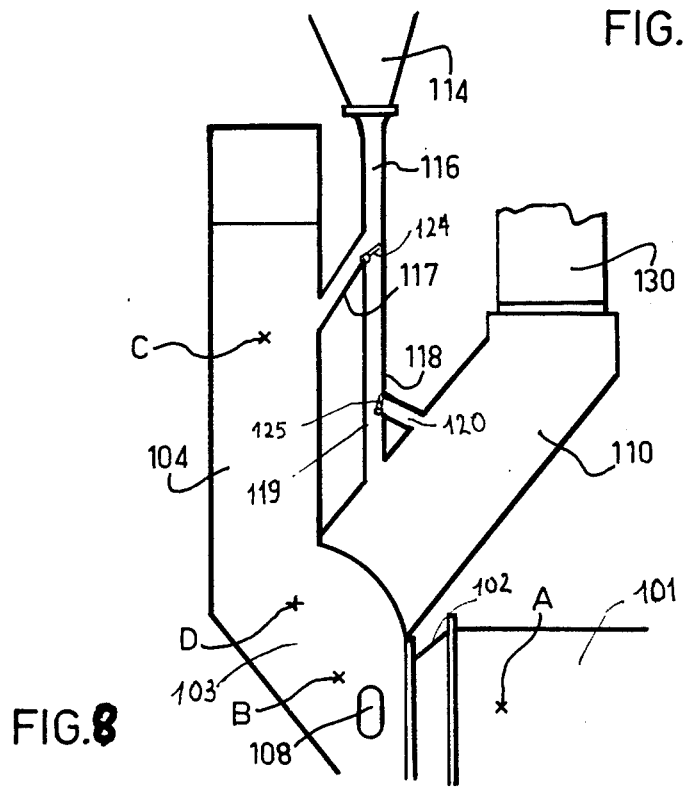
FIG. 8

METHOD AND INSTALLATION OF TREATING RAW MATERIAL FOR PRODUCING CEMENT

The instant invention relates to a method of treating raw material for producing cement in a cement-making installation of the type comprising a group of superimposed cyclones wherein the solid raw material and gases are circulated counter-currently in a vertical direction, said gases being adapted to cause the clinkerisation of said raw material and being generated by a furnace which is generally of the rotary type.

The invention is also related to an installation for carrying out the above-mentioned method.

In known cement-making processes and installations the raw material is treated by first entirely drying the same at a temperature of 100°–200° C, then entirely dehydroxylizing at a temperature of 400° to 500° C and finally entirely or partially decarbonating said raw material at a temperature of 800°–1000° C.

These steps are carried out in an exchanger comprising a group of cyclones, and the partially decarbonated raw material is then introduced into a rotary furnace arranged downstream of said exchanger, the raw material being completely decarbonated and converted into clinker in said furnace, in a manner known per se.

It is well known that when a fuel containing more than 1% sulphur is used in such a furnace, this will cause considerable quantities of solid material to deposit in the zone of junction between the rotary furnace and the exchanger.

The thus deposited material will result in a progressive reduction of the flow section of the gases issuing from the furnace, which in turn causes the output of the installation substantially to decrease.

The formation of the above-mentioned deposits may be explained as follows:

Both the raw material and the fuel carry variable amounts of sulphur which is volatile at the temperature reached by the treated material during its treatment under heat.

The vapours which are swept along under the effect of the counter-current flow are cooled with the gases and will condense at a certain temperature. This condensation temperature is reached in the upstream portion of the furnace.

Due to the low temperature of the fumes issuing from the furnace, the condensation takes place on the entire available surface, i.e. substantially on the dust particles contained in the gases, said particles thus constituting condensation nuclei.

Due to their conception and their geometrical outlay the installation captures the dust particles issuing from the furnace, which are loaded with condensated volatile substances.

Thus, as regards the volatile substances, the combined effects of the three phenomenae of volatilization, counter-current flow and particle capture lead to the establishment of a cycle of circulation similar to that of the material circulating in a milling or crushing machine. This cycle is in fact a recirculation cycle.

The dust particles loaded with condensing volatile substances thus carry within certain temperature limits a more or less important amount of a liquid phase, depending on the concentration values. When the gases carrying these dust particles encounter a fixed obstacle, said particles may adhere to said obstacle if the liquid concerned is of such a nature, and is present in such amounts as to enhance the tendency to adhering. When these particles contact the obstacle they will cool while adhering thereto, and solidify.

This process leads, after a certain time period, to the formation of the above-mentioned deposits.

Various methods have already been proposed with a view to preventing the building-up of such deposits.

One known method comprises decreasing the amount of recirculated sulphur by decreasing the amount of sulphur introduced into the installation, which may be achieved by using a fuel having a low or very low sulphur content; this method is quite expensive. The amount of recirculated sulphur may also be reduced by decreasing the risk of its being captured in the installation, which result may be achieved by by-passing a fraction of the gases at the furnace outlet. This latter solution is also expensive due to the loss of thermal energy which it involves.

Manual means may also be used for destroying the deposit as they are building up, either by injection of air under high pressure, or by raking.

However, these known methods only allow the disadvantages resulting from the deposit formation to be more or less reduced, and they bring along a considerable increase of the production cost.

The instant invention is aimed at providing a method of treating raw material for producing cement, which eliminates the formation of the deposits in the zone where such deposits tend to build up, upstream of the furnace.

It is thus one of the objects of the invention to provide a method of treating raw material for producing cement, wherein said raw material is heated, dehydroxylated and decarbonated, while the solid materials or substances constituting said raw material are fed into a rotary clinkerisation furnace along a downwardly directed flow path through a multi-stage exchanger comprising a group of mutually superimposed cyclones, wherein each stage of said exchanger is constituted by at least one of said cyclones, while a gas current issuing from said furnace is fed counter-current-wise in an upward direction along said path to contact said raw material, at least a portion of the raw material issuing from the penultimate stage of said exchanger being injected into said gas current in a zone adjacent the location in which said raw material enters said furnace, in which method the step of injecting at least a portion of said raw material into said gas current is carried out by injecting said raw material in the form of a homogeneous "curtain" or "screen" into an upstream section of said furnace which extends inside the furnace from the inlet end thereof.

Due to this injection of the raw material in the form of a homogeneous screen the gases issuing from the furnace at a temperature of 1060°–1100° C are cooled, whereby the temperature in the zone upstream of the furnace is decreased to a value lower than the critical temperature (i.e. 850° C) from which on, due to the absence of a liquid phase, no deposit is formed.

The material which causes this cooling effect to take place is carried along by the gas flow toward the last stage of the exchanger, as in the known process, and is then injected into the furnace.

This method the practical application of which requires only minor modifications of existing installations, as will be explained hereinafter, allows, among other advantages, fuel containing considerable amounts of sulphur (e.g. 3%) to be used, while yet eliminating the formation of deposits in the zone located upstream of the furnace, without any modification of the output of the installation or of the calorific consumption, the said method further resulting in a considerable improvement of the quality of the clinker thus obtained.

In another embodiment of the instant method the flow of solid material between the penultimate cyclone and the gas current issuing from the furnace is adjusted in accordance with the carbonation rate of said solid materials or substances as they issue from said penultimate cyclone.

In still another embodiment of the invention a fuel and a hot oxidant mixture is injected into the flow of the gases issuing from the rotary furnace.

More particularly, it is possible to use a fuel having a high sulphur content; this fuel may be the same as the one normally injected through the nozzle of the rotary furnace, and the amount of thus sprayed fuel may vary between 0 and 65% of the total amount of fuel used. As will be shown hereinafter, this spraying of fuel initiates the endothermic decarbonation reaction and thus stabilizes the temperature, particularly in the combustion chamber, at a value of about 850° C.

As far as the injection of the hot oxidant mixture is concerned, this enhances more particularly the suspension of the solid substances in the thus created gas current, and furthermore the introduction of an excess quantity of oxygen ensures the oxidizing combustion, which is an imperative requirement with a view to protecting the electro-filters of the installation.

Another object of the invention is to provide, in an installation for pre-treating raw material for producing cement, a device comprising a group of cyclones the last ones of which, with reference to the direction of the material flow, open into a rotary clinkerisation furnace at the junction between the latter and a fumes conduit opening into the last one of said cyclones, said device further comprising a distributor connected to the outlet of the penultimate cyclone and having at least two branch lines provided each with an adjustable valve, one of said branch lines defining a short flow path opening at a given location into said fumes conduit, while the other branch line, or lines, open into said fumes conduit at another location, or other locations, spaced from said given location, said other location, or one of said other locations, being arranged in a zone adjacent the inlet of said furnace.

Amongst other advantages the installation including the above-defined novel device allows of initiating the operation of the installation in a progressive (i.e. gradual) manner, and when desired of immediately switching over to the conventional operating mode, using the short flow path, without interruption of the production, and without any modification of the quality of the clinker thus produced.

These and other objects and features of the instant invention will become apparent from the description hereinbelow with reference to the appended drawings which illustrate various embodiments of the invention by way of example but not of limitation.

FIG. 1 of the drawings schematically shows a part of an installation for treating raw material used for producing cement, which installation is provided with a device for carrying out the method of the instant invention; said device is represented in an operating condition corresponding to a high decarbonatation rate of the treated raw material.

FIGS. 6 and 7 are front and side views, respectively, of an installation comprising a double exchanger which is also provided with means for carrying out the method according to the instant invention.

FIG. 8 shows an installation similar to the installation of FIG. 4, wherein the locations for measuring the temperature are indicated; for the purpose of comparison the temperatures have been measured during the operation of the installation in accordance with conventional methods on the one hand, and on the other hand during the operation of the installation in accordance with the invention.

Figure 1:
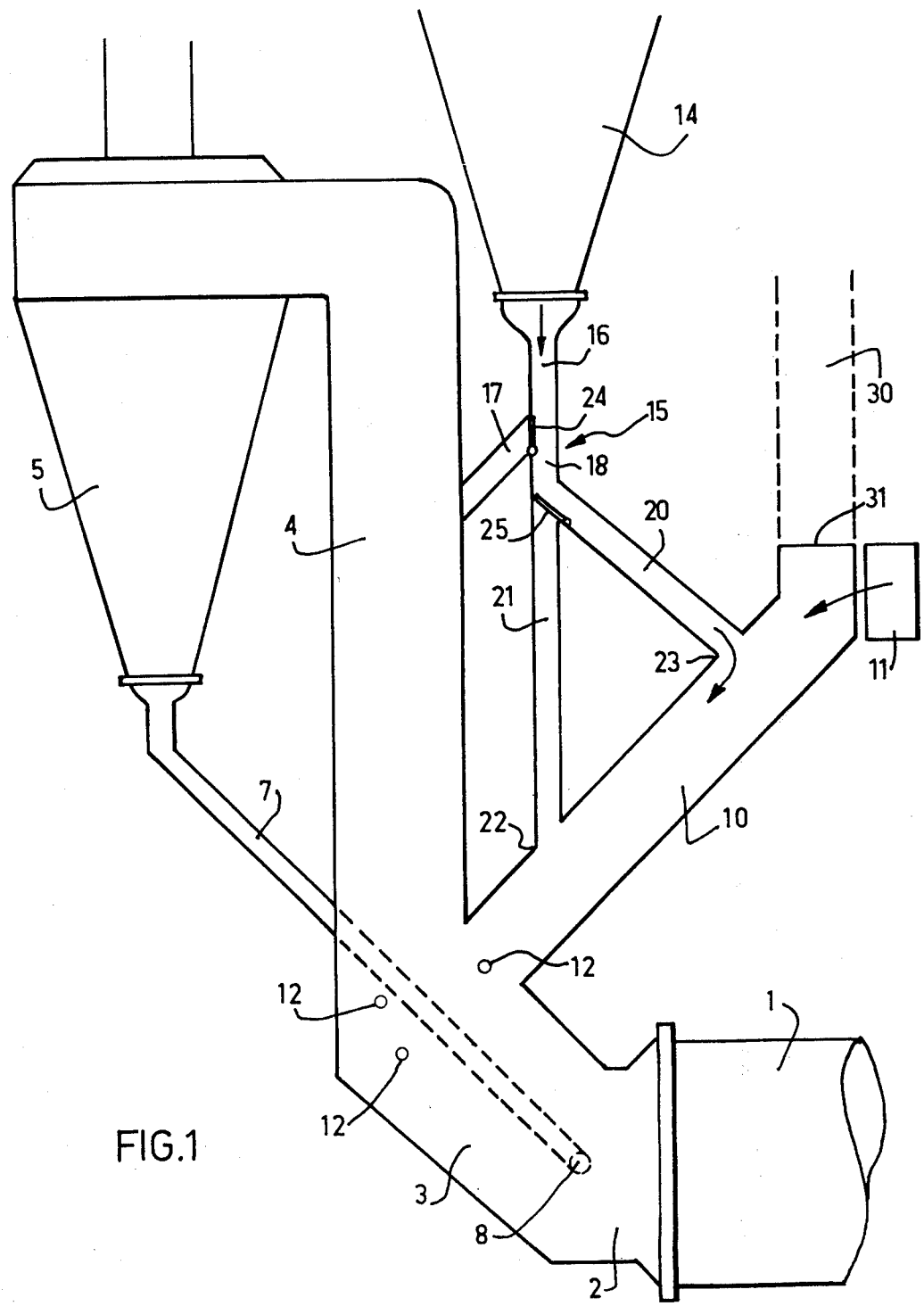

As described hereinbelow and as shown in FIG. 1, the installation for treating raw material for producing cement comprises a rotary clinkerization furnace 1 which is represented in part, and the inlet 2 of which is connected to a three-way connecting piece 3 constituting a junction chamber; a fumes conduit 4 opens into the chamber of a cyclone 5 which is the last one of a group of juxtaposed cyclones and in which the raw material to be treated is dried, dehydroxylized and at least partially decarbonated. The solid substances of said material move along a downwardly directed path through said group of cyclones while hot fumes and gases flow in a counter-current direction through said cyclones. The inlet conduit 7 for the solid substances, which is connected to the outlet of the last cyclone 5, opens at 8 into the junction chamber defined by the connecting piece 3, at the inlet of furnace 1.

In accordance with one feature of the instant invention, this connecting piece 3 is also connected with an oblique conduit 10; at its top portion this conduit 10 is connected to a hot gas generator 11 the operation of which will be described hereinbelow; this gas generator is adapted to provide an adjustable amount of hot excess air.

According to another feature of the instant invention, a plurality of fuel injectors 12 are provided in the junction chamber of connecting piece 3, three of said injectors being arranged, in the embodiment shown, above the orifice 8 of conduit 7 and connected to a source of fuel (not shown in the drawing).

According to another feature of the instant invention, the base of the penultimate cyclone 14 of the group of cyclones is connected to a distributing conduit assembly 15 for the solid matter to be treated, which distributing conduit assembly, or distributor, opens into conduit 10 and into fumes conduit 4.

This conduit assembly comprises a main conduit 16 connected to the base of cyclone 14 and bifurcating so as to form two branches 17 and 18 the first of which opens directly into fumes conduit 4, in the upper portion thereof. The second branch 18 bifurcates to form other branches 20 and 21 opening into conduit 10 at 22 and 23, respectively, the connecting location 23 being located in the upper portion of the conduit, while the connecting location 22 is located in the lower portion of said conduit, adjacent the inlet of furnace 1.

Adjustable valves 24 and 25 are arranged, respectively, on the bifurcations of conduits 17 and 18, on the one hand, and 20 and 21, on the other hand, these valves being adapted to control the flow of the raw material to be treated.

When valve 24 entirely seals conduit 18 all of the solid material coming from cyclone 14 is directly injected into fumes conduit 4, in a manner known per se, and in conformity with the operation of conventional installations of the kind considered.

If, on the contrary, valve 24 uncovers, at least partially, conduit 18, conduit 10 receives at least a portion of the material coming from the penultimate cyclone 14. This cyclone also receives the combustion gases from generator 11. The solid substances and the gases will be mixed in said cyclone and the solid matter will be suspended or fluidized. This flow of solid matter reaches the zone of the fuel injectors 12 which inject, for instance, a fuel having a high sulphur content. A decarbonatation of solid matter coming from conduit 10 takes place at this location, i.e. at the basis of conduit 10 and of fumes conduit 2 connected to the furnace. The oxygen required for the combustion of the fuel is provided, on the one hand by the gases issuing from furnace 1, and on the other hand by the hot gases issuing from generator 11.

An excess amount of oxygen is necessary with a view to achieving oxydizing of the gases resulting from the combustion and with a view to thus avoiding the deterioration of the dust filters of the installation by the said gases.

It should be noted in particular that since this decarbonation reaction is endothermic, the temperature of the fumes issuing from the furnace is lowered to 800°–900° C. Furthermore, a so-called "low temperature point" is formed at the inlet of the clinkerisation furnace, which constitutes an effective barrier with regard to the volatile alkaline phases produced in said furnace: This barrier initiates the condensation of said alkaline phases and thus displaces the zone of deposit formation toward the interior of the rotary furnace. Thus, the formation of said depositis is avoided in those portions of the installation which are located upstream of said furnace.

It will be understood that the fuel required for the process of producing cement is distributed over three locations, to wit: the burner of the rotary furnace, the hot gas generator 11 and the injectors 12. An amount of about 35% of the fuel is used at the first above-mentioned point, while the remainder of 65% of said fuel is used at the two other locations.

The amount of injected fuel varies of course, depending on the nature of the material to be treated. This material is distributed in the distributing conduit 15 with a view to adjusting in a continuous manner and within a broad range the rate of decarbonatation of the treated material at the inlet of the furnace.

In the circuit utilised in accordance with the embodiment shown in FIG. 1, the material to be treated is fed exclusively by conduit 20 into the higher portion of the conduit, conduits 17 and 21 being closed by valves 24 and 25; under these conditions the decarbonatation can be as complete as possible by virtue of the perfect mixture of the material with the hot gases issuing from generator 11.

Figure 2:
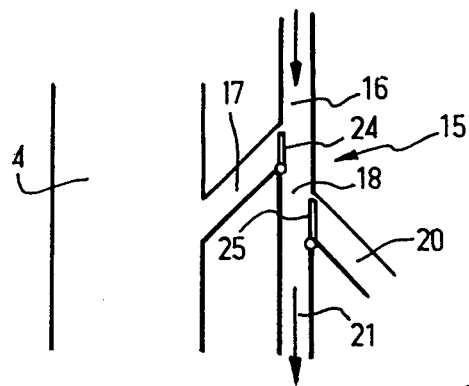
FIGS. 2 and 3 show details of the device of FIG. 1 in two different operating conditions corresponding to different decarbonatation rates of the treated raw material.

FIG. 2 shows an intermediate circuit; in this embodiment valves 24 and 25 seal conduits 17 and 20, and the material to be treated flows through conduit 21 to the entry of conduit 10.

Figure 3:
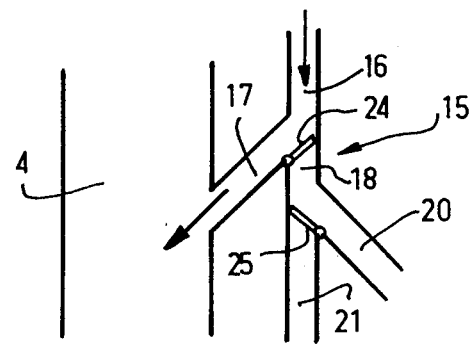

In the embodiment shown in FIG. 3 conduit 16 is open, while valve 24 seals conduits 20 and 21; this corresponds to the normal configuration and mode of operation of pre-treating installations.

All the intermediary phases between these three modes of operation may be realised and modified while the installation is operating, by conveniently adjusting valves 24 and 25.

It will thus be understood that the instant invention offers, among other advantages, a considerable flexibility in operation. The installation described herein above may be built at comparatively low cost, and it results in an increase of the output of the furnace; it allows a fuel having a high sulphur content to be used and allows the durability of the baking zone of the furnace to be increased; it further results in a decrease of the deposit formation at the basis of the fumes conduit, due to the decrease of the temperatures in the zone upstream of the furnace.

It will be understood that conduit 10 may in certain cases be constituted by the lower portion of the evacuation conduit 30 (cf. FIG. 1), which is normally provided with a view to facilitating the ignition of the rotary furnace, whereafter said evacuation conduit is sealed off. It suffices to provide sealing means (not shown) at 31 with a view to seal off this lower part of the conduit from the remaining parts thereof.

Table 1 indicates the operating characteristics of an existing cement producing installation comprising exchangers with cyclones, before and after said installation was equipped with the device described herein above.

Column 1 indicates the operating characteristics of the reference installation for a maximum production rate, taking into account the dimensions of said installation. The indicated decarbonation rate will not be substantially modified, and the utilisation of a fuel having a low sulphur content is imperative for the reasons which have been set forth herein above.

Column 2 indicates the operating conditions of the same installation after the latter has been equipped with a novel device as described herein above; the essential facts to be noted are the increase of production rate, the utilisation of heavy fuel having a sulphur contents of 3%, the possibility to vary the decarbonation rate between 35 and 90% by acting on valves 24 and 25 and on the distribution of the amounts of fuel burned respectively at the nozzle of the furnace and in the exchanger.

The valves indicated in Table 1 correspond to operating conditions involving the maximum decarbonatation rate.

Figure 4:
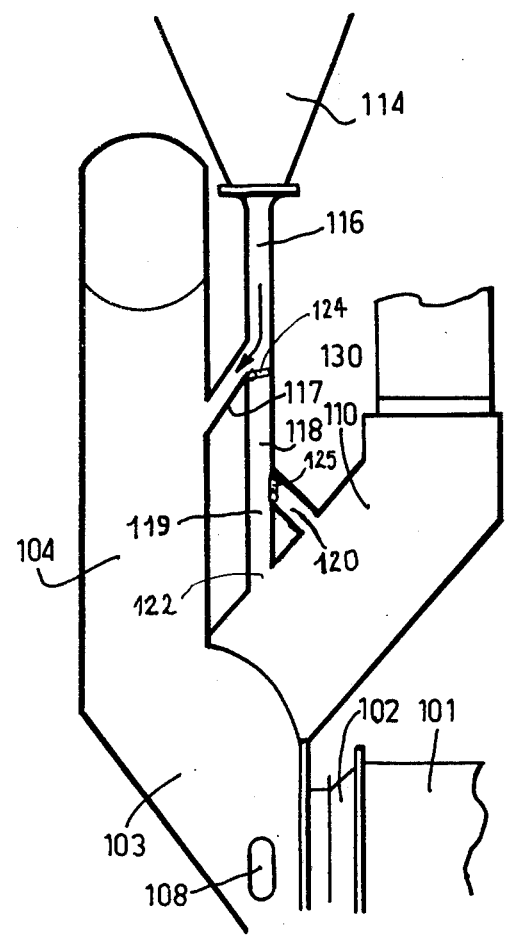

FIG. 4 shows another embodiment of the device according to the instant invention, which does not involve fuel injection. The elements of this embodiment which are similar to those represented in FIGS. 1 to 3 are designated by the same reference numerals, but increased each by 100.

Two adjustable valves 124 and 125, similar to valves 24 and 25 described herein above are arranged at the bifurcations of conduits 117–118 and 119–120. These valves also allow the flow of the material to be controlled.

When valve 124 completely seals conduit 118 all the solid material issuing from cyclone 114 is directly injected by conduit 117 into fumes conduit 104, in a manner known per se and in accordance with the mode of operation of conventional installations.

When, on the contrary, valve 124 opens at least partially conduit 118, at least a portion of the solid material issuing from the penultimate cyclone 114 is distributed and injected into oblique conduit 110 by adjustable valve 125 and conduits 119 and 120. At least this portion of the solid material forms a curtain or screen of material at the inlet of the furnace. As already described herein above this screen is contacted by the flow of hot gases issuing from the furnace, which results in a rapid cooling of this gas flow, the temperature of which will thus be lowered to a value smaller than the critical temperature (850° C) above which no deposit formation will take place. The screen of solid material which is thus formed at the inlet of the furnace leads to the establishment of a "cold zone" at the furnace inlet, which constitutes a barrier with regard to the volatile phases produced in the furnace.

Figure 5:
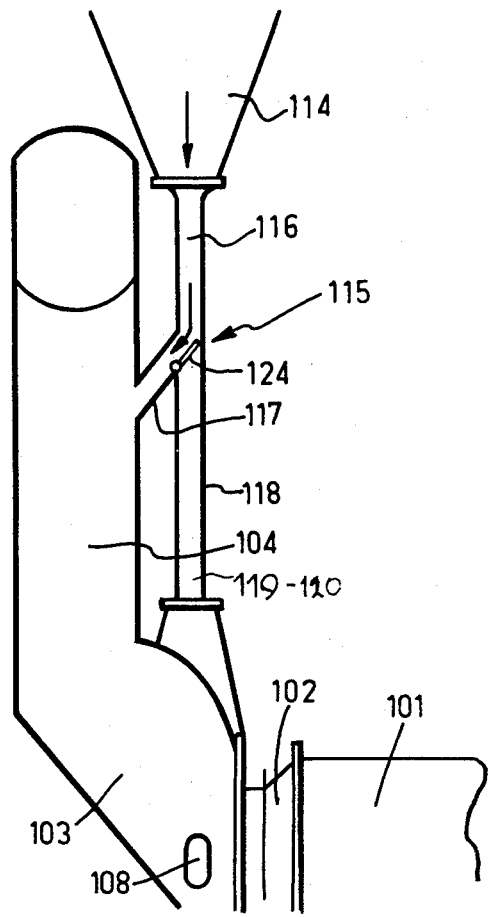
FIGS. 4 and 5 show two different embodiments of the device according to the invention.

FIG. 5 shows an installation similar to that FIG. 4; however, in this embodiment no oblique conduit 110 is provided. Conduits 119 and 120 open directly into the junction chamber 103.

The operation of this embodiment is similar to that of the embodiment described herein above.

It will be seen that this embodiment is similar to the installation described herein above with reference to FIGS. 1–3. In the instant embodiment a "cold zone" is also established; however, this cold zone is obtained here by injecting and burning a fuel having a high sulphur content above the inlet of the furnace, in the junction chamber. This combustion results in an endothermic decarbonation reaction whereby the temperature of the fumes issuing from the furnace is decreased, which leads to the same advantageous results as those described with reference to the embodiments shown in FIGS. 4 and 5.

FIGS. 6 and 7 illustrate another embodiment of a treating installation for carrying out the method according to the instant invention, which installation comprises a double group of exchangers constituted by cyclones. In these Figures the same reference numerals have also been used for designating similar elements. It should be noted however that the direct injection of the solid material into junction chamber 103 is effected by two groups of conduits 119–120 and 119a–120a, so as to form a curtain or screen of solid material as homogeneous as possible, at the inlet of furnace 101 (or at the outlet of this furnace, with respect to the direction of the flow of the gases).

The material of this screen is picked up by the current of gases issuing from the furnace and the temperature of the thus formed mixture of fluid and solid substances is maintained at a value than 850° C, as soon as said screen has been crossed. In an installation operating in accordance with the conventional methods, the temperature in the same zone will be comprised between 1000° and 1050° C. It has been shown that in such a conventional installation it is not possible to establish operating conditions wherein only a reduced deposit formation will take place, lest a fuel having a low sulphur content (0.7%) be used, while the method according to the instant invention allows a normal fuel of the number 2 type to be used, without resulting in any deposit formation.

Table 2 compares the operating parameters of an installation of the type schematically shown in FIG. 5, which is provided with the novel device according to the invention, and of a similar installation which is not provided with the said novel device.

The locations A, B, C, D, at which the temperature was measured, and which are mentioned in this Table, are indicated in FIG. 5.

It will be understood that the scope of the instant invention is by no means limited to the embodiment described herein above and shown in the drawings. Various modifications may be made to the invention by any person skilled in the art while yet remaining within the scope of the instant invention as claimed in the appended claims.

TABLE 1

| | | characteristic parameters of the installation to which the novel device has not been added | characteristic parameters of the installation after adding thereto the novel device (FIG. 1) |
|---|---|---|---|
| Furnace output (tons per day) | | 1 300 | 1 500 |
| Calorific consumption (Kcal/kg clinker) | | 820 | 820 |
| Nature of the fuel used | | BTS fuel (0.5% S) | normal fuel (3% S) |
| (Furnace nozzle | | 100% | 35% |
| Fuel distribution | | | |
| (Exchanger | | 0% | 65% |
| Decarbonation rate at furnace inlet | | 35% | 90% |
| Parameters | Temperature (° C) | 1 050 | 900 |
| measured | Depression (mm H$_2$O) | 30–40 | 25–30 |
| at furnace | Gas flow rate (Nm$^3$/s) | 19 | 17 |
| outlet | Gas velocity (m/s) | 16 | 13 |
| (Junction 3) | Excess amount of O$_2$ (%) | 1.5–2 | 12–13 |
| Parameters | Temperature (° C) | 900 | 850 |
| measured at | Depression (mm H$_2$O) | 80–90 | 100–110 |
| upper fumes | Gas flow rate (Nm$^3$/s) | 20 | 25 |
| conduit | Gas velocity (m/s) | 22 | 26 |
| (portion 4) | Excess amount of O$_2$ (%) | 1.5–2 | 1.5–2 |

TABLE 2

| | Parameters of the installation (FIG. 8) | |
|---|---|---|
| | Prior to installing the novel device | After installing the novel device |
| Furnace output (tons per day) | 1300 | 1300 |
| Calorific consumption (KCal/kg clinker) | 820 | 820 |
| Nature of the fuel | BTS fuel (0.7% sulphur) | normal fuel (3% sulphur) |
| SO$_3$ content of the clinker | 0.48% | 1% |

TABLE 2-continued

| | Parameters of the installation (FIG. 8) | |
|---|---|---|
| | Prior to installing the novel device | After installing the novel device |
| Parameters measured upstream of furnace | | |
| Temperature at A (° C) | 1050–1100 | 1050–1100 |
| Temperature at B (° C) | 1000–1050 | 830 |
| Temperature at C (° C) | 850 | 830 |
| Depression at D (mm $H_2O$) | 30–40 | 15–25 |

What is claimed is:

1. In a method for treating raw material containing solid substances for producing cement, in an installation comprising: a rotary clinkerization kiln, said kiln having an inlet end and an outlet end, said kiln inlet end being in communication with a junction chamber defined by a junction member; a downwardly directed flow path including a plurality of successive cyclones each defining a cyclone chamber, a fumes conduit for interconnecting the last of said cyclone chambers with said junction chamber whereby the fumes issuing from said inlet end of said kiln will flow through said junction chamber and said fumes conduit into said last cyclone chamber, a material inlet conduit for interconnecting the material outlet of said last of said cyclones with said junction chamber at a point adjacent said kiln inlet; said method comprising the steps of drying, dehydroxylating, and decarbonating said material by feeding said solid substances along said downwardly directed flow path into said inlet end of said clinkerization kiln, and contacting said solid substances, while said substances are fed along said downwardly directed flow path, with a current of upwardly directed gases generated in said kiln and issuing through said inlet end thereof, the improvement comprising the additional steps of: removing an adjustable portion of the material issuing from the penultimate one of said successive cyclones and injecting said removed portion of material into said junction chamber at a location downstream, with reference to the flow direction of said current of gases issuing from said inlet end of said kiln, from the point of communication of said materials inlet conduit with said junction chamber, and directing the remainder of said material issuing from said penultimate cyclone into said fumes conduit at a point downstream of said injection location of said adjustable portion of material issuing from said penultimate cyclone, whereby said adjustable portion of material may be used to cool the current of gases issuing from said inlet end of said kiln to thereby reduce the buildup of deposits in said installation.

2. The method of claim 1, wherein said step of injecting an adjustable portion of said material issuing from said penultimate cyclone comprises injecting said material into said junction chamber through a conduit connected at an oblique angle to said junction chamber, said method comprising the further step of injecting hot gases produced by a hot gas generator into said oblique conduit whereby said hot gases, said adjustable portion of material, and said current of gases will be mixed in said junction chamber.

3. The method of claim 2 wherein adjustable fractions of said removed portion of material are directed into said oblique conduit at at least two spaced locations thereof.

4. The method of claim 1, further comprising the step of injecting a mixture of fuel and hot oxidant into a zone substantially defined by said junction chamber.

* * * * *